3,476,294
LINE MARKING MACHINES
Peter A. McGuffie, 10a Oxford Road, Link Top,
Malvern, Worcestershire, England
Filed Jan. 2, 1968, Ser. No. 695,222
Claims priority, application Great Britain, Jan. 6, 1967,
871/67
Int. Cl. B67d 5/64
U.S. Cl. 222—177                                                5 Claims

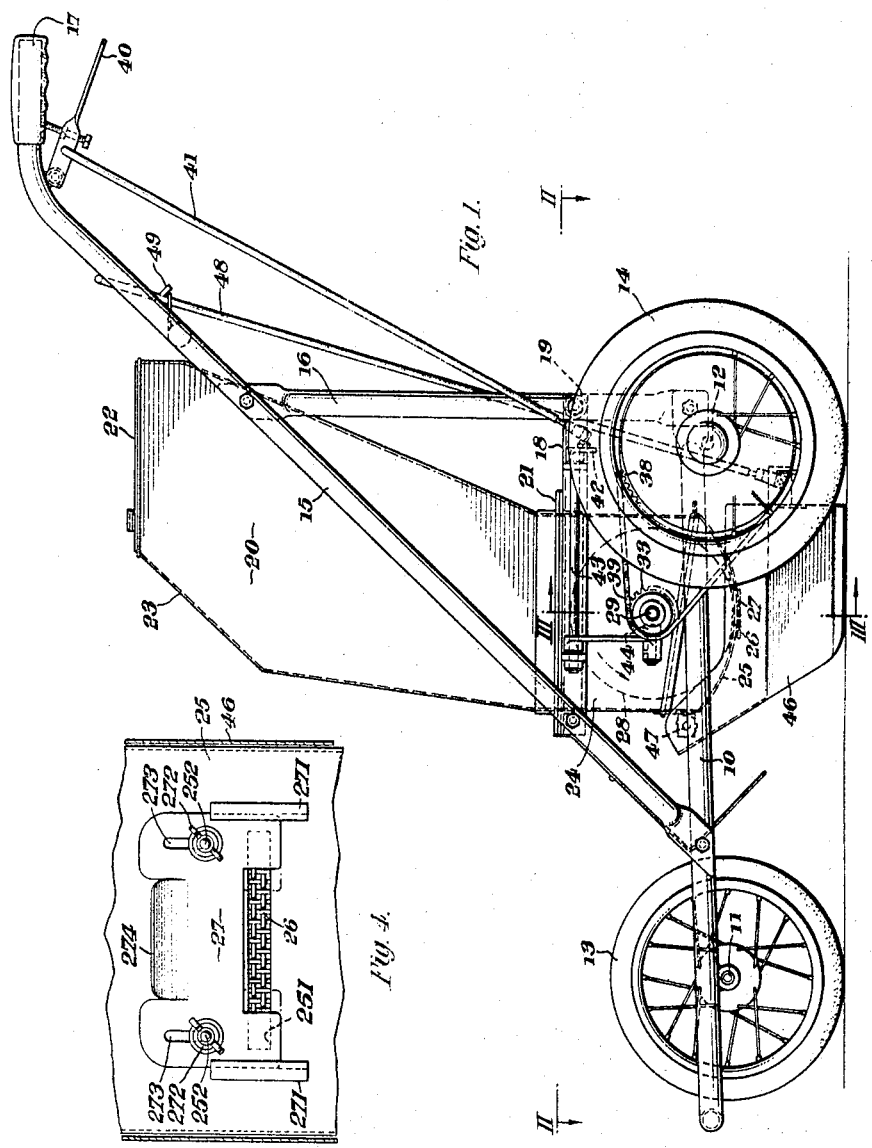

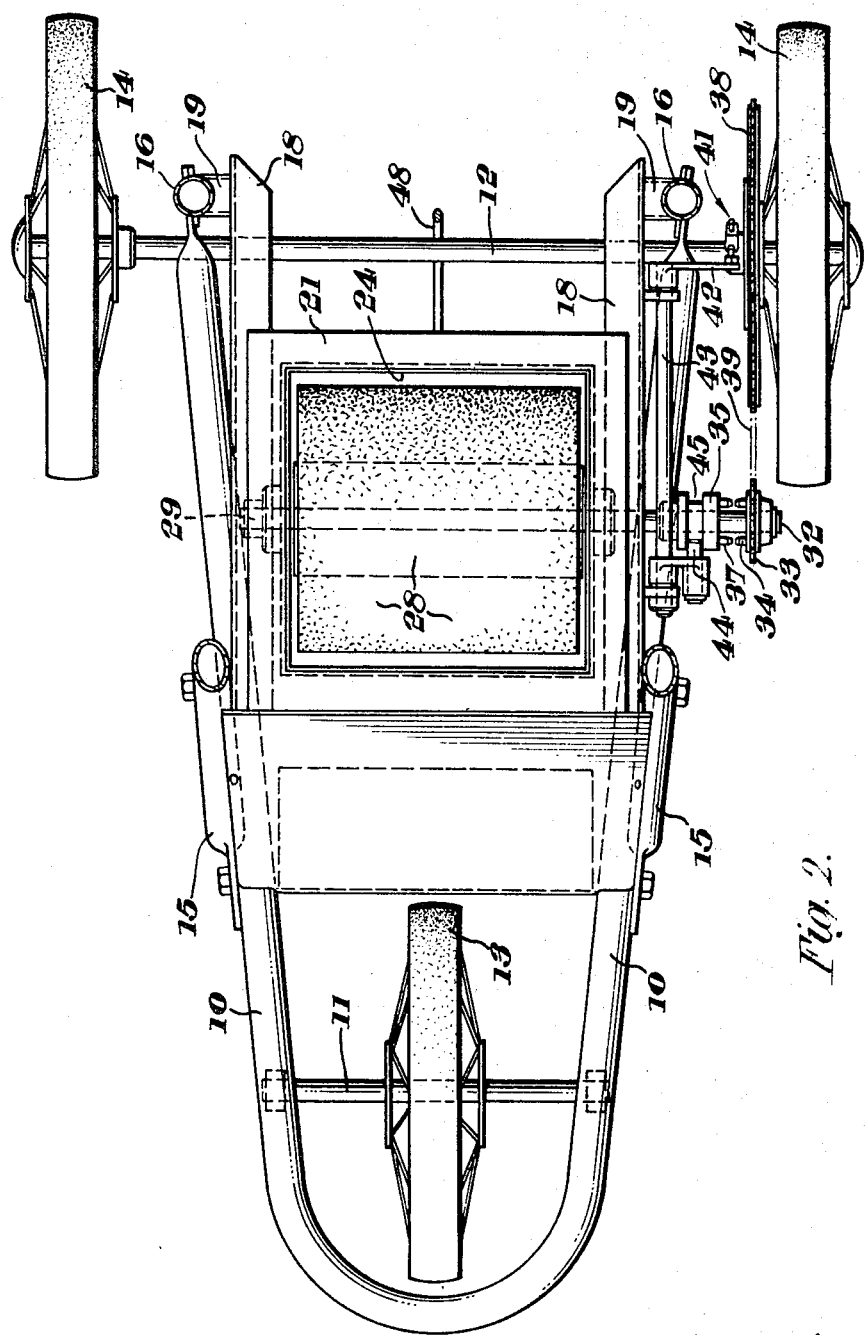

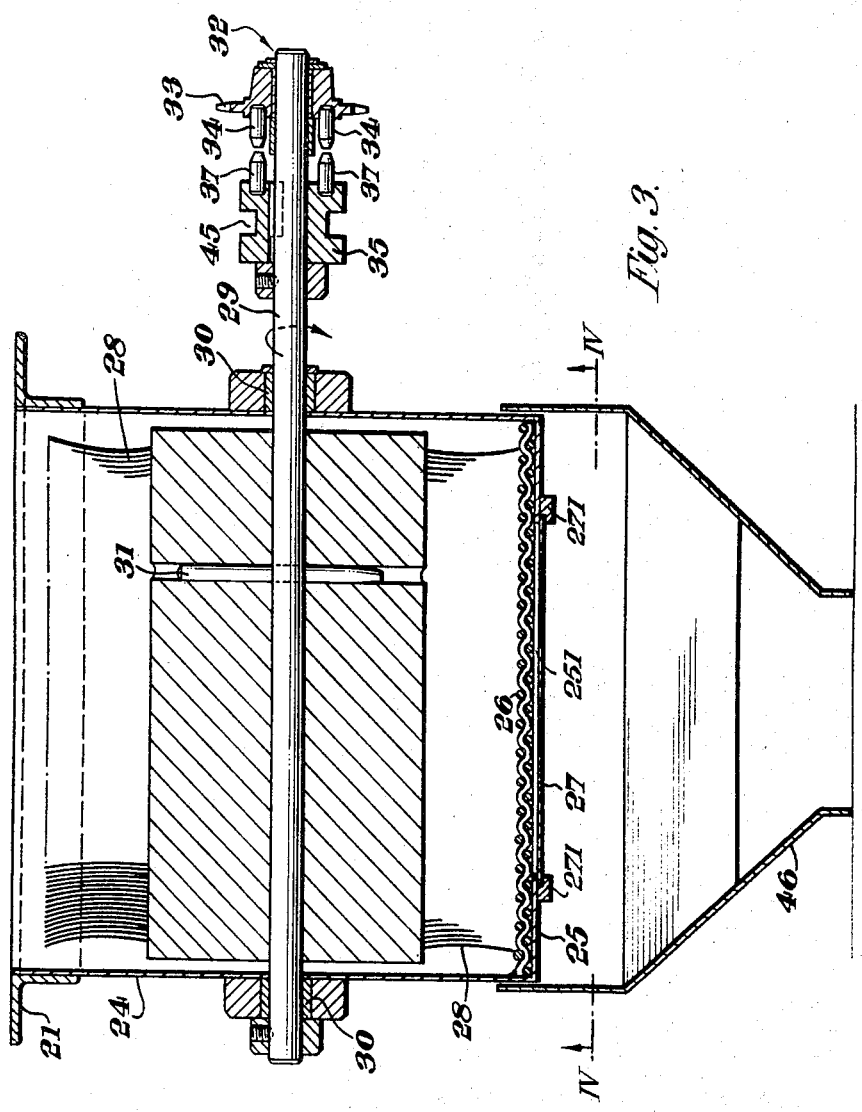

ABSTRACT OF THE DISCLOSURE

A line marking machine, e.g. for playing fields, adapted to use dry powdered line marking material, is in the form of a wheeled trolley and has a rotary brush cooperating with a grid-covered aperture to act as a dispensing element. The brush is driven through a clutch from the trolley wheels. The aperture can be controlled by a slide plate and the width of the line is defined by downwardly and longitudinally extending side pieces mounted on either side of the aperture.

---

This invention relates to machines for marking lines on open ground, e.g. playing fields, car parks and the like, and is particularly concerned with machines for use with dry powdered line marking materials, such as those described and claimed in my patent specification No. 999,111, or hydrated lime or whiting.

Some of these marking materials have a strong tendency to pack or clog in the container in the machine. With machines of conventional type, which relay upon gravity for dispensing the marking material, such packing or clogging can cause interruptions in the line being marked or can give the operator the impression that the machine is empty when a substantial proportion of the marking material remains unused.

According to the present invention, a line marking machine for use with a dry powdered line marking material comprises a wheeled trolley supporting a container for the marking material, wherein a base portion of the said container accommodates a rotary dispensing element and means are provided for rotating the dispensing element when the machine is wheeled along the line to be marked, so as to dispense the marking material on to the ground through an aperture in the said base portion.

The rotary dispensing element may be a brush of circular section mounted upon a horizontal spindle. The base portion of the container is preferably rectangular in plan and the brush is cylindrical and occupies most of the space in said base portion. Preferably the brush is fast with the spindle and means are provided for driving the spindle from one of the wheels of the trolley through a clutch.

A specific embodiment of the invention will now be described by way of example and with reference to the accompanying drawings, in which:

FIGURE 1 is a side elevation of a line marking machine,
FIGURE 2 is a plan view, partly in section on the line II—II of FIGURE 1.
FIGURE 3 is a sectional view, to a larger scale, on the line III—III of FIGURE 1, and
FIGURE 4 is a detail sectional view on the line IV—IV of FIGURE 3.

In this embodiment, the machine is in the form of a three-wheeled trolley having a horizontal tubular frame member 10 of roughly U-shape in plan, in which are supported front and rear axles 11, 12, respectively carrying a front wheel 13 and rear wheels 14. The frame also comprises pairs of inclined and vertical tubular members, 15, 16 bolted to the horizontal frame member 10 and to one another. The upper ends of the inclined frame member 15 are provided with hand grips and form a pair of handles 17 by which the machine can be pushed along the ground. A pair of horizontal members 18 are attached at their front ends to the inclined frame members 15 and at their rear ends to the vertical frame members 16 through lugs 19.

The horizontal members 18 support a container or hopper 20 for the dry powdered line marking material, through a peripheral flange member 21. The hopper 20 has a removable lid 22 and is slightly tapered downwardly, the inclination of its sides to the vertical being kept small to avoid the danger of marking material clinging to the sides. The upper part 23 of the front of the hopper is cut back to allow the operator to see the front wheel 13 when pushing the machine along from behind.

The hopper 20 has a base portion 24 which is rectangular in plan. The floor 25 of the base portion 24 is curved as seen in side elevation and is formed with a wide central aperture 251 which can be wholly or partly closed by a slide plate 27 movable in the fore and aft direction in guides 271. The slide plate 27 can be clamped to the floor 25 by means of wing nuts 272 threaded on studs 252 which are attached to floor 25 and pass through slots 273 in plate 27. A finger grip 274 is provided on the plate 27 to facilitate its movement by the operator when wing nuts 272 have been loosened. A sheet of wire gauge 26 (FIGURES 1 and 3) forms a grid extending across the aperture. The base portion 24 accommodates a cylindrical brush 28 mounted on a horizontal spindle 29 which can revolve in bearings 30 (FIGURE 3) in the sides of base portion 24. The brush 28 occupies most of the space in the base portion 24 and is secured to the spindle 29 by means of a pin 31 so as to rotate therewith. One end 32 of the spindle 29 has rotatably mounted on it a small chain sprocket 33 carrying clutch dogs 34. A clutch member 35 carrying similar dogs 37 is keyed to the spindle 29 so as to be slidable axially along it but incapable of rotation relative to it. A large chain wheel 38 is fixed to the adjacent rear wheel 14 of the trolley and a chain 39 passes round the sprocket 33 and chain wheel 38, so that the sprocket 33 is rotated at a relatively high speed whenever the trolley is pushed along the ground. Axial movement of the clutch member 35, to engage and disengage the clutch, is controlled by a hand lever 40 pivoted on the handle 17 and operating through a rod 41 (FIGURE 1) and a lever 42 (FIGURE 2) mounted on one end of a longitudinal shaft 43 whose other end carries a laterally moving fork 44 which engages in a peripheral groove 45 in the clutch member 35.

A pair of inwardly cranked, longitudinally extending side pieces or line formers 46 are pivoted at 47 to lugs on the front of the base portion 24 of the hopper. The line formers 46 are shown in their operative position, from which they can be retracted by pulling upwards a control rod 48, which is retained by a catch 49.

In use, when a line is to be marked, the slide plate 27 is retracted to open the aperture in the floor 25 to the required extent, the line formers 46 are lowered and the clutch 35 is engaged. The machine is then pushed along the line. Powdered marking material falls on to the brush 28 which is rotated by the chain drive 38, 39, 33, so that its bristles pick up the powder and feed it downwardly. As the bristles strike against the gauze 26, the powder is dislodged from them and falls to the ground. The depending side pieces or line formers 46 concentrate the falling material into a well defined line. When the line has been completed, the aperture in the floor 25 is closed by means of the slide plate 27, the line formers 46 are raised and the clutch 35 is disengaged. The machine can then be pushed away without risk of any further material dropping on to the ground.

The constant agitating and dispensing action of the brush ensures that no packing of the marking material can occur and that the material is evenly distributed along the line.

If it is desired to mark a line of a different width, the slide plate 27 is changed for one which exposes an appropriately greater or lesser width of the aperture 251, and the line formers 46 are changed for a pair which are cranked inwardly to a correspondingly greater or lesser extent. In every case, the width of the aperture 251 exposed and the width between the bottom parts of the line formers 46 are both equal to the width of the line to be marked.

If desired, two brushes may be mounted in an extended base portion of the hopper, one ahead of the other on parallel shafts which are driven in opposite senses, so as to increase the rate of application of the powdered material to the ground. One of the brushes may be driven as described above from an axle of the trolley and the other may then be driven from the first brush by a simple gearing which reverses the sense of rotation. Striking pieces (i.e. gauzes 26) are fitted under both brushes as described above.

What I claim as my invention and desire to secure by Letters Patent is:

1. A line marking machine for use with dry powdered line marking material, comprising a wheeled trolley, a container for said marking material supported on said trolley, base means defining an aperture in the lower portion of said container, cylindrical brush means having bristles extending laterally therefrom substantially filling said aperture, rotatable horizontal spindle means upon which said brush is actually mounted, said spindle means being journaled into said base means at a point to allow said brush to extend upwardly into said container and downwardly from said aperture, driving means connecting said spindle to an axle on said wheeled trolley transmitting rotational energy from said trolley wheels to said spindle thereby rotating said brush, clutch means for connecting said driving means to and disconnecting said driving means from said spindle, grid means extending across said aperture defined by said base means, said grid being positioned so that said bristles brush across a surface of said grid when said brush means is rotated, slidable plate means for closing said aperture, said plate means operable to open said aperture to any predetermined width, retractable side plate means extending vertically downward from the sides of said aperture and extending longitudinally with respect to the direction of travel of said machine to form a means for controlling the width of said line, and handle means for pushing and guiding said trolley and having in addition a second control member operatively connected to said side plates for retracting said side plates and extending to and disposed adjacent one of said handles.

2. The line marking machine defined in claim 1 wherein said clutch is a dog clutch.

3. The line marking machine defined in claim 1 having in addition a control member operatively connected to said clutch and extending to and disposed adjacent one of said handles.

4. The line marking machine defined in claim 1 wherein said driving means comprises a chain and sprocket drive.

5. The line marking machine defined in claim 4 wherein said chain and sprocket driving mechanism comprises a relatively larger diameter sprocket axially attached to said axle on said trolley, a relatively smaller diameter sprocket axially attached to said spindle and an endless chain connected around each of said sprockets.

References Cited

UNITED STATES PATENTS

| | | | |
|---|---|---|---|
| 1,040,888 | 10/1912 | Comrie | 222—177 |
| 1,191,116 | 7/1916 | Schippell | 222—177 |
| 1,322,705 | 11/1919 | Locke | 222—177 |
| 1,940,447 | 12/1933 | Coffing | 222—177 |
| 2,710,117 | 6/1955 | Fritz et al. | 222—177 |
| 2,781,955 | 2/1957 | Kidd | 222—561 |
| 2,855,128 | 10/1958 | Cookson et al. | 222—352 |
| 3,098,588 | 7/1963 | Ryan. | |

WALTER SOBIN, Primary Examiner

U.S. Cl. X.R.

222—196, 282, 410, 478, 560, 561